United States Patent
Lee et al.

(10) Patent No.: US 6,456,604 B1
(45) Date of Patent: Sep. 24, 2002

(54) DATA COMMUNICATION METHOD IN MOBILE COMMUNICATION SYSTEM

(75) Inventors: Hyun-Suk Lee, Seoul (KR); Dae-Gyun Kim, Seoul (KR); Young-Ky Kim, Seoul (KR); Dong-Ho Cho, Seoul (KR); Sung-Won Lee, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/236,783

(22) Filed: Jan. 25, 1999

(30) Foreign Application Priority Data

Jan. 24, 1998 (KR) .............................. 98/2263

(51) Int. Cl.[7] .................................. H04J 3/16
(52) U.S. Cl. ..................................... 370/328
(58) Field of Search ................. 370/318, 320, 370/311, 474, 480, 405, 486, 148, 503, 516, 328, 329, 341, 349, 350, 442, 439, 438, 437, 433, 342, 441, 401, 384, 522, 524; 375/325, 326, 327, 371, 375, 376; 455/442, 428, 439, 445, 452, 458, 464, 466

(56) References Cited

U.S. PATENT DOCUMENTS

| | | |
|---|---|---|
| 5,673,259 A | 9/1997 | Quick, Jr. |
| 5,754,541 A | 5/1998 | Glisic et al. |
| 5,790,551 A | 8/1998 | Chan |
| 5,806,007 A | 9/1998 | Raith et al. |
| 5,818,829 A | 10/1998 | Raith et al. |
| 6,275,712 B1 * | 8/2001 | Gray et al. .......... 455/522 |
| 6,307,868 B1 * | 10/2001 | Rakib et al. .......... 370/516 |

* cited by examiner

Primary Examiner—Dang Ton
(74) Attorney, Agent, or Firm—Dilworth & Barrese, LLP

(57) ABSTRACT

A method for performing data communication in a mobile communication system is disclosed. The method serves to increase channel efficiency by connecting and releasing channels in accordance with the presence/absence of control and traffic data transmitted during packet data communications. Transmission power and mobile terminal battery power are conserved by controlling outputs of a dedicated control channel and a pilot channel when data transmission is discontinued temporarily during data communications. The mobile communication system includes an active state in which user data is transmitted through a dedicated traffic channel and control messages are transmitted through a dedicated control channel. In accordance with the method, a transition is made from the active state to a first control hold state when there is no control or user data to transmit for a first preset time. In the first control hold state, the dedicated traffic channel is released while the dedicated control channel and a reverse pilot channel are maintained. A transition is made from the first control state to a second control hold state when there is no user or control data to transmit for a second preset time. In the second control hold state, which is a resource save sub-state, the transmission outputs of the dedicated control channel and reverse pilot channel are interrupted to conserve power.

18 Claims, 5 Drawing Sheets

DATA COMMUNICATION METHOD IN MOBILE COMMUNICATION SYSTEM

BACKGROUND OF THE INVENTION

1. Field of the Invention

The present invention relates to a data communication method in a mobile communication system, and in particular, to a method for reducing battery power consumption of a mobile station when no user traffic is transmitted thereby, while maintaining a dedicated control channel.

2. Description of the Related Art

At present, mobile communication systems using a Code Division Multiple Access (CDMA) protocol operate in accordance with the IS-95 standard, which supports voice service only. In the near future, mobile communications will be performed according to an International Mobile Telecommunication-2000 (IMT-2000) standard which supports high speed packet data service as well as voice service. The IMT-2000 Standard aims at multimedia services such as high quality voice service, a moving picture service, an Internet search service, etc.

A mobile communication system with packet data communication capability transmits data in bursts, with relatively long and frequent standstill periods between bursts in which data is not transmitted, in accordance with the packet data traffic pattern. Hence, for future mobile communication systems, there has been proposed a technique for "connecting" data communication channels only when the data bursts are transmitted during the packet data communication. "Connecting" channels refers to the process of becoming properly set up on both sides of the radio link to enable immediate communication. Taking into consideration the limited radio resources, the base station air capacity and the battery power of the mobile terminal, it is desirable to connect a dedicated traffic channel only while the data is transmitted; to release the traffic channels for other mobile stations while the data is not transmitted; and quickly re-connect the channels when user data appears.

However, to reassign the traffic channel and the control channel in order to re-start transmitting the data after stoppage of the data transmission, channel renegotiation is generally necessary between the base station and the terminal. This re-negotiation procedure may result in additional signaling overhead and latency. The signaling overhead includes a control message necessary for synchronization of a radio link protocol (RLP), and a control message necessary for the service negotiation made during the re-connection of the data service.

A number of data communication methods have been proposed for use in mobile communication systems. For example, U.S. Pat. No. 5,673,259 discloses a random access communication channel for data services suited for use in CDMA applications. In that patent, mobile terminals transmit data packets on the random access channel on a reverse link to a base station. When bandwidth demand exceeds a first threshold, a processor switches from the random access channel to a dedicated channel for communicating the data packet between the mobile terminal and the base station. When the bandwidth drops below a second threshold, the processor switches from the dedicated channel to the random access channel.

Another example is International patent application WO95/35637 (U.S. Pat. No. 5,754,541) which discloses a data transmission method in a CDMA cellular radio network. Signals transmitted by mobile stations are divided into bursts in the time domain. The system therein strives to achieve high traffic capacity by means of a base station transmitting information to mobile stations about the load state of a traffic channel used by the base station. The number of bursts transmitted between the mobile stations and the base station per time unit is controlled on the basis of the delay state of the bursts and the load state information computed at the base station.

SUMMARY OF THE INVENTION

It is an object of the present invention to provide a method for increasing utilization efficiency of channel resources by connecting and releasing channels in accordance with the presence/absence of traffic data transmitted during a packet data communication in a mobile communication system.

It is another object of the present invention to provide a method for increasing channel efficiency and conserving mobile terminal transmission power by controlling outputs of a dedicated control channel and a pilot channel when data transmission is discontinued temporarily during the data communication in a mobile communication system.

According to one aspect of the present invention, a data communication method is provided in a base station of a mobile communication system including an active state in which user data is transmitted through a dedicated traffic channel and control messages are transmitted through a dedicated control channel. In accordance with this method, a transition is made from the active state to a first control hold state when there is no data to transmit for a first set time. In the first control hold state, the dedicated traffic channel is released while the dedicated control channel is maintained. A transition is made from the first control state to a second control hold state when there is no user or control data to transmit for a second set time. In the second control hold state, the transmission output of the dedicated control channel is interrupted.

According to another aspect of the present invention, a data communication method is provided in a terminal of a mobile communication system, in which a pilot signal is transmitted by the terminal through a reverse pilot channel. A transition is made from an active state to a first control hold state which releases a dedicated traffic channel and maintains a dedicated control channel and the reverse pilot channel. Another transition is made from the first control hold state to a second control hold state where the transmission outputs of a dedicated control channel and reverse pilot channel are controlled to conserve power.

BRIEF DESCRIPTION OF THE DRAWINGS

The above and other objects, features and advantages of the present invention will become more apparent from the following detailed description of a preferred embodiment thereof, taken in conjunction with the accompanying drawings in which like reference numerals indicate like parts, wherein.

DETAILED DESCRIPTION OF THE PREFERRED EMBODIMENT

Figure 1:
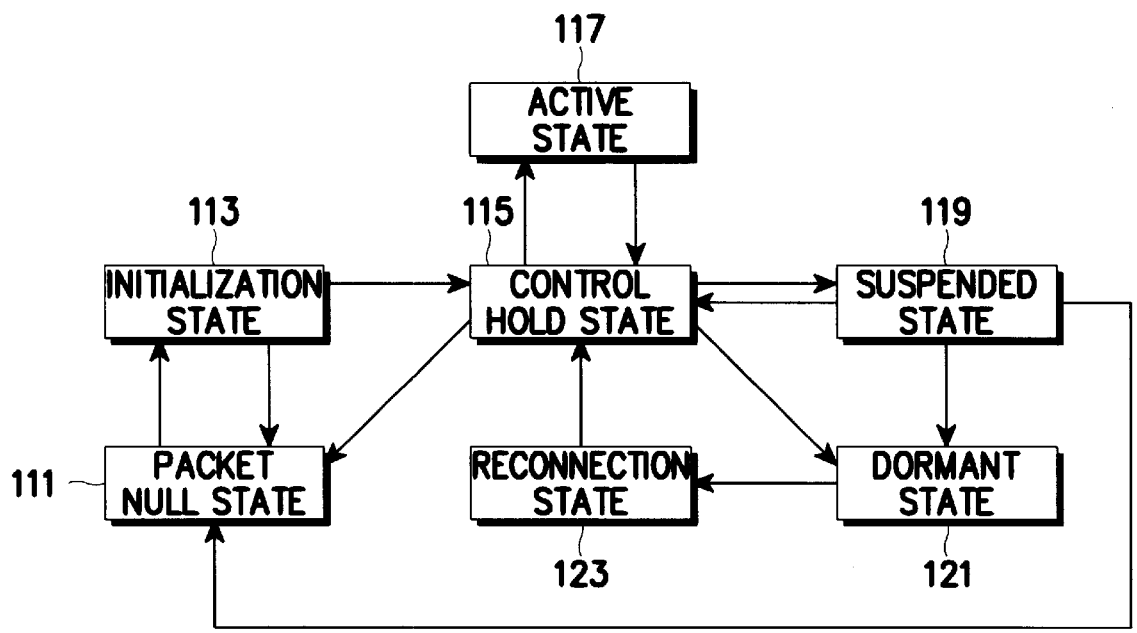
FIG. 1 is a state transition diagram illustrating data service operating states in a mobile communication system.

A preferred embodiment of the present invention implements data communications in a mobile communication system by utilizing new channels which are in addition to the conventional voice and control channels. New states are defined for performing the data communication using the new channels. For clarity of explanation, the channels used in the embodiment and the states occurring during the data communication service will first be defined hereinbelow.

As used in this detailed description, the term "connection" encompasses both "logical" and "physical" connections. The term "logical connection", as used herein, refers to a state in which signals may be transmitted on an assigned channel, but where the transmission output at one or both sides of the communication link is "physically" restricted so as to reduce power consumption and the interference level in the air. In this case, the assigned channel is referred to as a logical channel. Such physical restriction may be implemented, for example, by temporarily cutting off battery power to various electronic circuitry in the transmit electronics of the mobile terminal. Further, the term "traffic data" means user data and the term "control data" encompasses both a control message and a signaling message communicated through a dedicated control channel. In addition, "data" may refer to both the control data and the traffic data. A channel carrying signals from a base station to a mobile terminal is designated as a forward channel; a channel carrying signals from a mobile terminal to a base station is designated as a reverse channel.

The relationship between the logical channels and "physical channels" is shown in Table 1. Physical channels refer to normal data communication channels in which signals are transmitted without being physically restricted as in the logical channels.

TABLE 1

| OPERATING STATE | Forward Link | | Reverse Link | |
|---|---|---|---|---|
| | Logical CH | Physical CH | Logical CH | Physical CH |
| Initialization State | PPCH | Paging CH | PACH | Access CH |
| Control Hold State | DMCH DSCH | Dedicated Control CH | DMCH DSCH | Dedicated Control CH |
| Active State | DMCH DSCH DTCH | Dedicated Control CH | DMCH DSCH DTCH | Dedicated Control CH |
| | DTCH | Supplemental CH | DTCH | Supplemental CH |
| Suspended State | PMCH | Paging CH | PMCH | Packet Access CH |
| Dormant State | PPCH | Paging CH | PACH | Access CH |

Certain logical channels in Table 1 are designed for suitability with a state transition model, to be discussed in detail below, in which transitions are made between various operating states. A packet paging channel (PPCH) in the initialization state is a forward channel through which the base station transfers a layer 3 signaling message and a medium access control (MAC) message. The PPCH is used in three states: the initialization state, a dormant state (where it is called PDPCH) and a suspended state (where it is called PSPCH). A packet access channel (PACH) is a channel used by the mobile terminal to transmit a reverse 3-layer signaling message and a reverse medium access control message. This channel is shared by the mobile terminals through an access mechanism based on competition. The packet access channel is called PDACH in the dormant state and PSACH in the suspended state. A dedicated MAC channel (DMCH) is a bi-directional channel used for transmission of the medium access control message. This channel is a one-to-one channel assigned in a "control hold" state and in the active state for the packet service. A dedicated signaling channel (DSCH) is a channel used for transmission of the layer 3 signaling message. This channel is a one-to-one channel assigned in the control hold state and the active state for the packet service. (A one-to-one channel is an unshared channel.) A dedicated traffic channel (DTCH) is a channel utilized for transmission of the user data. This channel is a one-to-one channel assigned in the active state for the packet service. A common traffic channel (CTCH) is a forward or reverse channel for transmitting instantaneous short data in a dormant/idle sub-state of the dormant state. This logical channel is a one-to-one channel assigned during a short data transmission interval.

The forward link includes the common control channel (Control CH), the dedicated traffic channel, the dedicated control channel, the paging channel and a forward pilot channel. Signals on the forward pilot channel are continually transmitted by the base station in all operating states. The forward pilot channel is used for synchronization between the mobile terminal and the base station or for power control of the terminal. Through the forward pilot channel, all the terminals can receive a pilot signal transmitted by the base station. The paging channel is used when the base station searches for a specific mobile terminal. Since all the terminals receive a signal on this channel, a paging channel message requires an identification field for discrimination of the terminals. Therefore, the paging channel is not suitable for transmission of mass data. To transmit mass data, the dedicated control channel and the dedicated traffic channel are assigned to the respective terminals. The dedicated traffic channel is used to transmit user packet data, whereas the dedicated control channel is used to transmit control and signaling messages. These dedicated channels are synchronized with the pilot channel and operate in a Discrete Transmit (DTX) mode (or burst mode) where the data can be transmitted only when needed. The output of the pilot channel is always maintained so as to avoid losing synchronization. The discrete transmit mode affords effective use of the overall output from the base station by preventing unnecessary data output.

As shown in Table 1, the reverse link includes the common access channel, the packet access channel, the dedicated traffic channel (DTCH), the dedicated control channel and a dedicated reverse pilot channel. The common access channel and the packet access channel are shared by a number of terminals and used for transmitting the control signal necessary for assignment of the dedicated channels. The dedicated traffic and control channels are used in the same way as those in the forward link. The reverse dedicated pilot channel is used to transmit a pilot signal and power control information to the base station. Each mobile terminal is assigned a unique dedicated pilot channel, the reason being that a pilot synchronization of one terminal cannot be used by another terminal since the respective terminals may be at different distances from the base station. More specifically, with high speed packet data communications, accurate timing of bursts is an important performance consideration for the system. Hence, a timing adjustment for range delay is necessary, and since synchronization is a function of the range delay, each terminal needs to use a dedicated reverse pilot channel.

With reference now to FIG. 1, the terminal and the base station using the above-described channels operate according to the shown state transition diagram. A packet null state 111 is a state in which the mobile terminal's power is turned on, waiting for a data service-related request to be received. When a packet data service request is received by the mobile terminal, transition to an initialization state 113 takes place.

In the initialization state 113, the forward and reverse dedicated control channels are established for the data transmission. These established dedicated control channels can be used by the corresponding terminal only. After establishing the dedicated control channels, the initialization state transitions to a control hold state 115.

At this point, in the control hold state 115 the dedicated traffic channels are established to transmit user and/or control data, if any. After such data transmission, the control hold state 115 transitions to an active state 117. In the active state 117, traffic and control data are transmitted using the dedicated traffic and control channels, respectively. If there is no data transmitted or received for a time $T_{\_Active}$ which is set in a timer in the active state 117, transition occurs from the active state 117 back to the control hold state 115. In other words, this transition takes place if there is any time gap in data transmitted or received, of at least $T_{\_Active}$. In this case, the dedicated traffic channel is released. If no data is generated on either end for a time $T_{\_Hold}$ (which is likewise set in a timer) in the control hold state 115, the dedicated control channel is released and thereafter, the control hold state 115 transitions to a suspended state 119. Note that the timers may be included in the base station and/or the terminal. For the case where the timers are included in the base station only, the base station controls the state transition using the timers and the terminal is subjected to the state transition under the control of the base station. This case will be assumed in the ensuing description.

In the suspended state 119, the dedicated control channel and the dedicated traffic channel, which are unique channels assigned to the respective terminals, are all released. In this state, the communication between the base station and mobile terminals is performed over common channels which are shared by a number of terminals.

In the control hold state 115, the dedicated control channel and the pilot channel are maintained bidirectionally, so that the control channel remains connected even though no current data is being transmitted. As a result, a control signal can be immediately transmitted when needed. For the forward link from the base station to the terminal, the base station has no restriction concerning its own power consumption, since the base station does not have a power consumption problem. However, for the reverse link from the terminal to the base station, since the data is transmitted by the terminal which uses a battery, the permissible power consumption is limited. Accordingly, it is very important to reduce the power consumption of the terminal in the mobile communication system.

Figure 2:
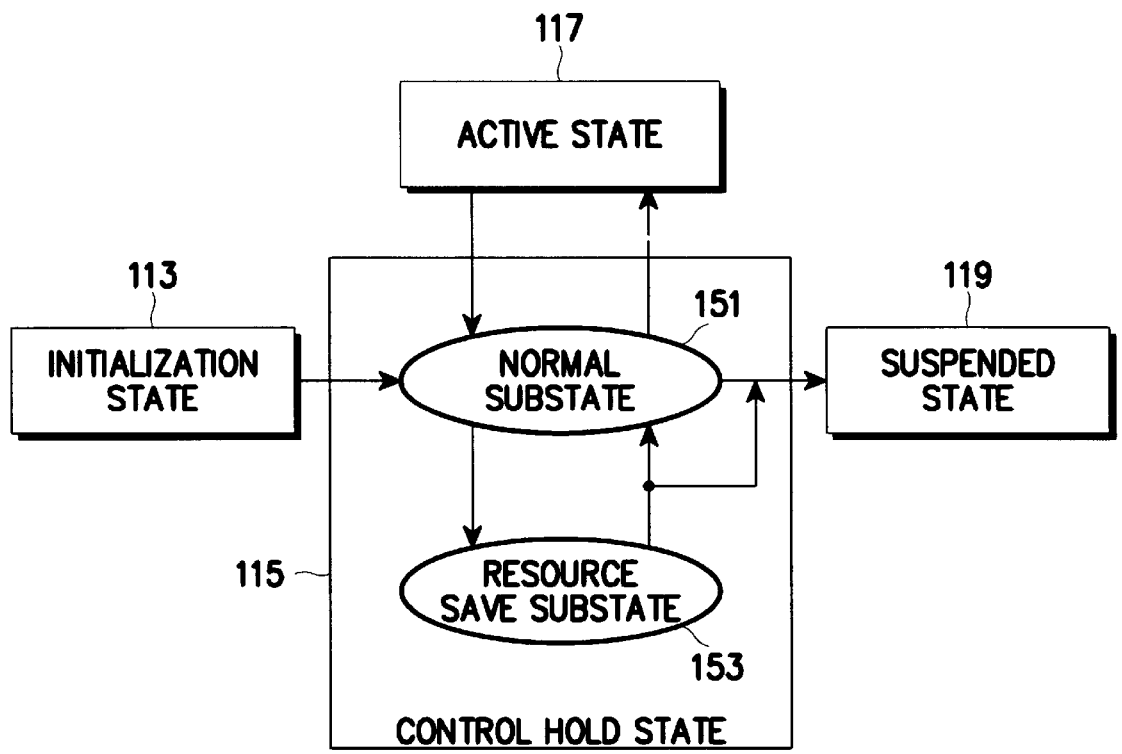
FIG. 2 is a state transition diagram for explaining a control hold state in a mobile communication system according to an embodiment of the present invention.

Therefore, the suspended state 119 is used to conserve system resources including the transmission power by releasing the dedicated channels. In the suspended state 119, however, it takes a relatively long time to reassign the control channel, which would decrease data transmission efficiency absent a means to compensate for this reassignment time. Accordingly, the control hold state 115 according to the present invention includes sub-states for resolving this transmission efficiency reduction problem in the suspended state 119. Specifically, the control hold state 115 includes a normal sub-state 151 and a resource save sub-state 153, as illustrated in FIG. 2.

The normal sub-state 151 is a state where the dedicated control channel is connected but the dedicated traffic channel is not connected. In this sub-state, control information according to the state transition can be transmitted and received on the control channels. Here, if a preset time $T_{\_Normal}$ has elapsed without transmission of a control signal or generation of user data to be transmitted, the base station notifies the terminal of this condition and then enters the resource save sub-state 153. However, if data to be transmitted is being generated (in the base station) or the control signal is received from the terminal within the set time $T_{\_Normal}$, the base station establishes the dedicated traffic channel, notifies the terminal of this condition and then transitions back to the active state 117.

The resource save sub-state 153 logically connects the dedicated control channel as well as the reverse pilot channel. (As noted above, when a channel is "logically connected", a transmission output on one or both sides of the communication link is restricted.) In this sub-state, an output of the reverse pilot channel and forward power control bits are "0". As a result, the power control bits which were being transmitted through the forward dedicated control channel, and the reverse pilot signal which was being transmitted through the reverse pilot channel, are no longer transmitted, thereby releasing a closed loop power control between the base station and the terminal. Since the reverse pilot channel signal is not transmitted, the reverse dedicated control channel which was maintaining synchronization using the reverse pilot channel signal, cannot transmit control messages at this point, due to the lack of synchronization. In the resource save sub-state 153, if user data to be transmitted or control data is not generated for a set time $T_{\_Save}$, the base station notifies the terminal of this condition and then transits to the suspended state 119. On the other hand, if the data is generated within the time $T_{\_Save}$, the base station notifies the terminal of this situation and then transitions to the normal sub-state 151.

To transition from the resource save sub-state 153 to the normal sub-state 151, a command to initiate the transition can be invoked at either the base station or the terminal. When invoked at the base station, this transition initiation command is transmitted through the forward dedicated control channel. The command is transmitted at an initial power level on the forward dedicated control channel. When the terminal does not respond to signals transmitted at the initial power level, the base station increases the transmit power and retransmits the command. This retransmission is necessary because the terminal is mobile, i.e., because the previously used initial power may be insufficient if the terminal is located too far away from the base station. With this technique, it is possible to restore the channel while minimizing interference with other terminals.

Figure 3:
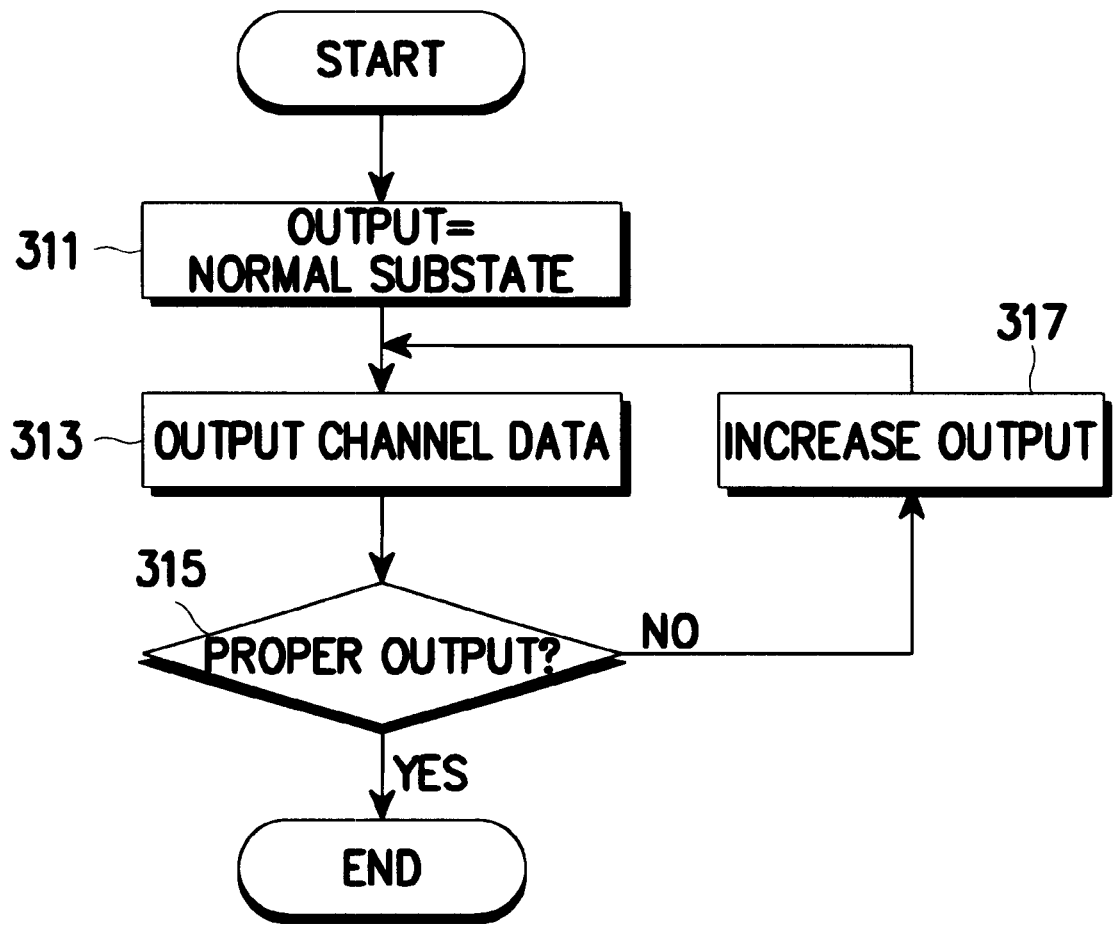
FIG. 3 is a flowchart illustrating a method for determining an initial output value of a forward dedicated control channel in a resource save sub-state of a control hold state according to an embodiment of the present invention.

Referring to FIG. 3, a method for determining the initial power of the forward dedicated control channel in the resource save sub-state 153 is illustrated. This initial power is used when transitioning out of the resource save sub-state. When in the resource save sub-state 153, the forward and reverse dedicated control channels and the reverse pilot channel are logically connected, so that closed loop power control is unavailable. Therefore, when transitioning out of the resource save sub-state 153, the base station sets the initial power of the dedicated control channel to the value used in the normal sub-state 151, in step 311, and then outputs the channel data in step 313. Thereafter, in step 315, it is determined whether the output is proper. If the output is not proper (i.e., if there is no response from the terminal), the base station increases the output in step 317 and returns to step 313. However, if it is determined that the output is proper, the routine is ended.

If the data transmission is invoked at the terminal, rather than at the base station, the terminal sets an output of the reverse pilot channel to the normal state. Here, the power of the reverse pilot channel is determined depending on the signal strength of the forward pilot channel. Since the reverse pilot channel can be started at any time, the base station should be designed to always wait to receive the reverse pilot channel signal that the terminal transmits in the resource save sub-state 153. To detect the pilot channel of the terminal, the base station searches for the pilot signal received through the reverse pilot channel for a predetermined time. This is called a search window. However, when the terminal turns on the reverse pilot channel again in the state where the reverse pilot channel is logically connected, the search time is preferably increased by changing the size of the search window in order to immediately search for the pilot channel. It is possible to minimize the search time for the reverse pilot channel, using $$\tau \, v_{max} t_{save} \quad (1)$$

where $\tau$ is a search time, $v_{max}$ is a maximum moving velocity of the terminal and $t_{save}$ is a resource save sub-state maintaining time.

Upon acquisition of the reverse pilot channel, the base station sends a control message informing the terminal of such acquisition through the forward dedicated control channel. In addition, the base station generates a power control bit based on the signal strength of the restored reverse pilot channel, and transmits this bit to the terminal through the forward dedicated control channel. With use of this information, the terminal then can determine the power control bit to be sent through the reverse link. By performing the above procedures, the control channels logically connected in the resource save sub-state 153 are all restored, transitioning to the normal sub-state 151. At this point, the time $T_{\_Normal}$ is reset by driving the timer and the state variable is also changed to the normal state.

Turning now to the method by which the terminal transitions from the resource save sub-state 153 to the suspended state 119, this transition can take place at either the terminal or the base station. When taking place at the terminal, the terminal restores the reverse dedicated control channel in the same manner as described above; transmits a message informing the base station that the terminal will transition to the suspended state 119 through the dedicated control channel; and then transitions to the suspended state 119. When the transition takes place at the base station, the base station sends a message informing the terminal that the state transition is required. The message is sent on the forward dedicated control channel in current operation. Upon reception of this message, the terminal then releases the dedicated control channel in the resource save sub-state 153 and directly transitions to the suspended state 119.

When the state transition takes place from the suspended state 119 to the control hold state 115, the normal sub-state 151 is selected without passing the resource save sub-state 153 in order to reduce the time required in establishing the dedicated control channel. However, when transitioning from the resource save sub-state 153 to the suspended state 119, the terminal transitions to the normal sub-state 151 and then transitions to the suspended state 119.

Figure 4:
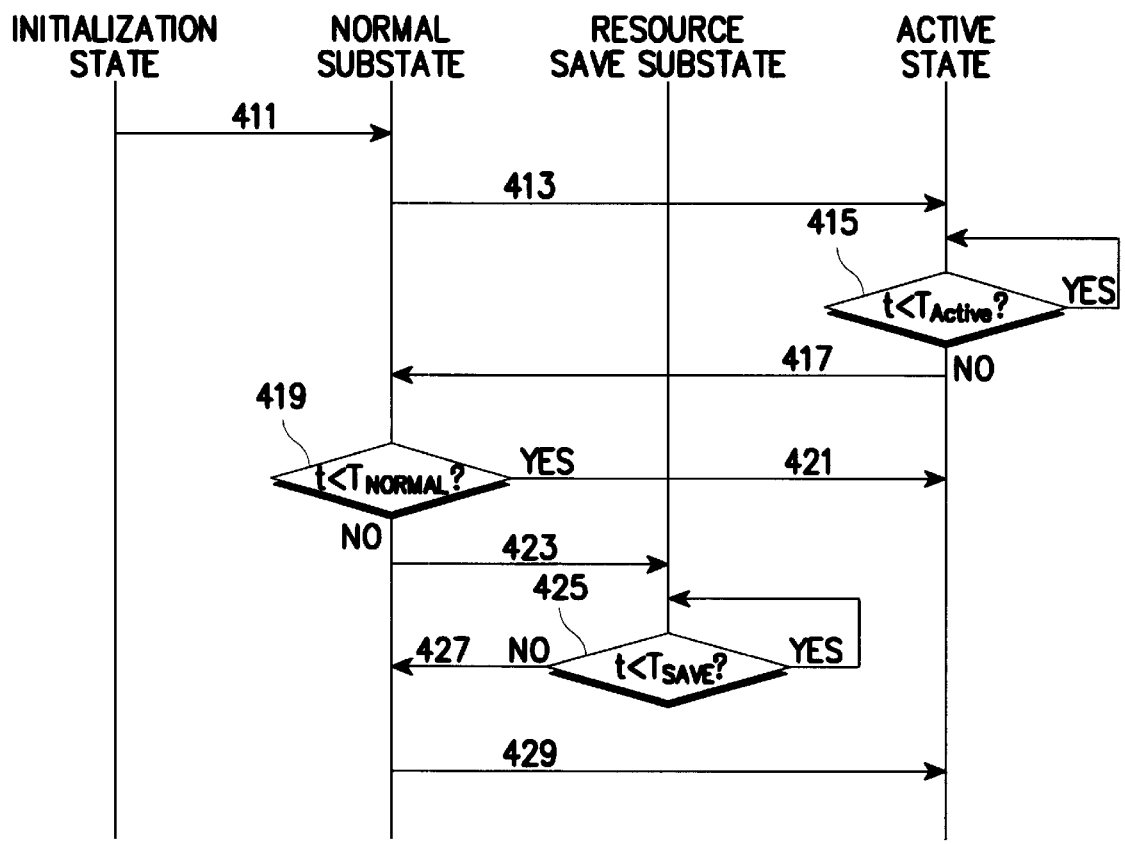
FIG. 4 is a flowchart for explaining a transition to an active state after a call setup and a transition from the active state to the control hold state in a mobile communication system according to an embodiment of the present invention.

FIG. 4 is a flowchart illustrating a procedure that the base station may use to connect the forward and reverse dedicated control channels during initialization and then transmit the data. Upon reception of a data transmission request through the paging channel or the access channel in the initialization state 113, the base station establishes the dedicated control channel and transitions to the normal sub-state 151 of the control hold state 115, in step 411. In the normal sub-state 151, if the data to be transmitted is generated or transmission control data is received through the dedicated control channel, the base station notifies the terminal of this condition through the dedicated traffic channel, releases the dedicated traffic channel to connect the dedicated control channel, and then transitions to the active state, in step 413. In the active state, if the dedicated traffic channel and the dedicated control channel are connected, the base station performs the data communication function for the time $T_{\_Active}$ through the dedicated traffic channel and exchanges the control message and the signaling message through the dedicated control channel. Here, the time $T_{\_Active}$ is a first reference time necessary for the transition from the active state 117 to the normal sub-state 151. Accordingly, the base station maintains the active state 117 if the data is transmitted within the time $T_{\_Active}$. The time $T_{\_Active}$ is initialized to restart when the data is generated.

However, if discontinuance of data transmission continues for the time $T_{\_Active}$ in the active state 117, the base station senses it in step 415. Subsequently, in step 417, the base station notifies the terminal of this situation through the dedicated traffic channel, releases the dedicated traffic channel to connect the dedicated control channel and then transitions to the normal sub-state 151. At this point, the time $T_{\_Active}$ is cleared. After transition to the normal sub-state 151, the base station analyzes in step 419 information on the dedicated control channel to check whether the data is generated within the time $T_{\_Normal}$. The time $T_{\_Normal}$ is a second reference time necessary for the transition from the normal sub-state 151 to the resource save sub-state 153. If the data to be transmitted is generated with time $T_{\_Normal}$, the base station senses the same in step 419. Thereafter, in step 421, the base station notifies the terminal of this condition (i.e., transmits to the terminal a control message necessary for assignment of the dedicated traffic channel), establishes the dedicated traffic channel, and then transitions to the active state 117.

If there is no data to be transmitted for the time $T_{\_Normal}$ in the normal sub-state 151, the base station senses this lack of data in step 419. Subsequently, in step 423, the base station notifies the terminal to maintain the logical connection of the dedicated control channel and the reverse pilot channel, discontinues outputting the transmit data and transitions to the resource save sub-state 153. In the resource save sub-state 153, the forward dedicated control channel and the reverse dedicated control channel are logically connected, so that the output is controlled whether signals are transmitted or not. At this time, the dedicated control channel is also logically connected. Accordingly, since there is no signal transmitted from the terminal to the base station through the reverse link, it is possible to conserve battery power of the terminal. In addition, since the dedicated control channel is logically connected, the base station can quickly send the data when needed. At this point, the time $T_{\_Normal}$ is cleared.

After the transition to the resource save sub-state 153, the base station analyzes in step 425 information on the dedicated control channel to check whether any data to be sent is generated within a time $T_{\_Save}$. Time $T_{\_Save}$ is a third reference time used for the transition from the resource save sub-state 153 to the suspended state 119. The base station senses in step 425 whether or not such data is generated within $T_{\_Save}$. If data is generated within that time, in step 427 the base station transmits to the terminal a control message necessary for establishment of the bi-directional dedicated control channels and the reverse pilot channel, and then transitions to the normal sub-state 151. In the normal sub-state 151, the base station assigns the dedicated traffic channel and transitions to the active state, in step 429.

As described above, when discontinuance of the data transmission exceeds the first reference time in the active state, the base station releases the dedicated traffic channel currently in operation, and maintains the dedicated control channel only. Accordingly, since the traffic channel is released when traffic data is not being transmitted, other users can use the traffic channel, thereby increasing the traffic channel efficiency. Moreover, since the dedicated control channel is connected, the base station can establish a new dedicated traffic channel and transition to the active state 117 as soon as data is generated in the normal sub-state 151.

In addition, if data to be transmitted is not generated within the second reference time in the normal sub-state 151, the base station logically connects the reverse pilot channel to control the output and transitions to the resource save sub-state 153 where the dedicated control channel is also maintained in the logical connection state. In this case, since the terminal does not transmit any data, it is possible to conserve battery power of the terminal. When in the resource save sub-state, the base station can quickly transition to the normal sub-state 151 as soon as data is generated.

Figure 5:
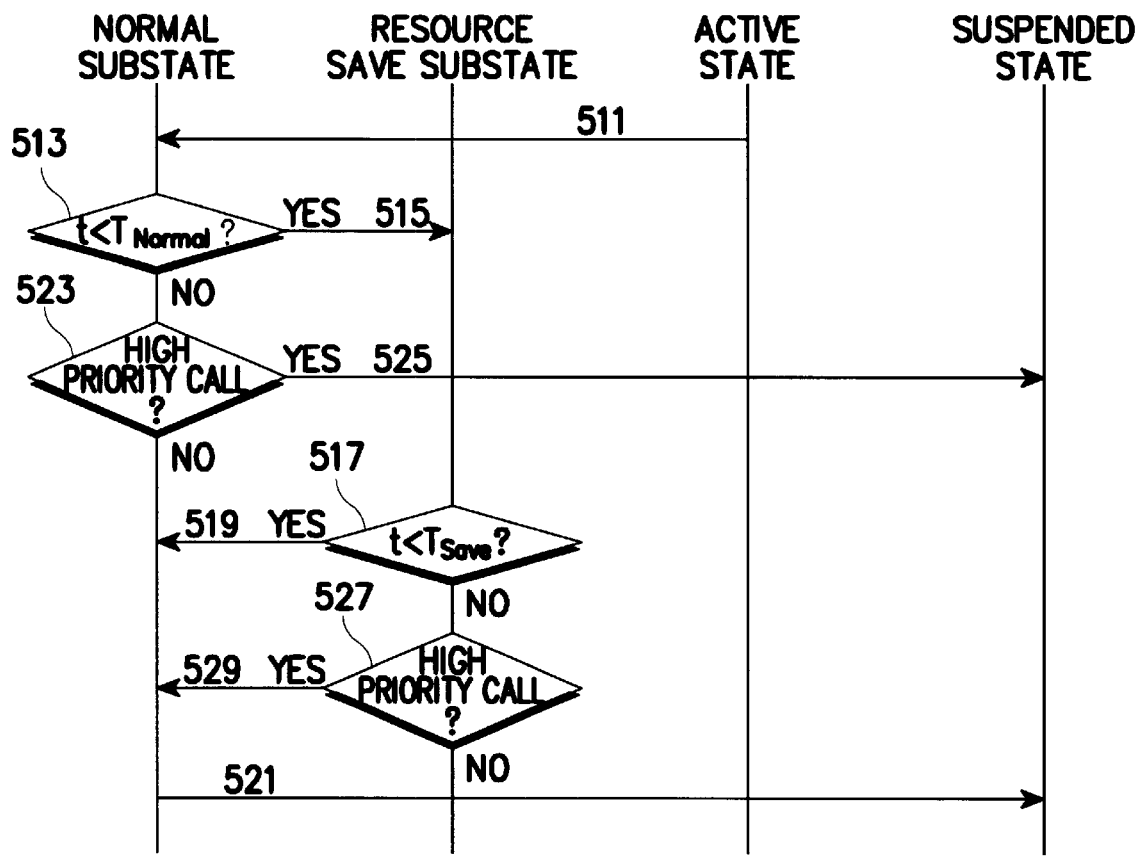
FIG. 5 is a flowchart for explaining a transition from the active state to the control hold state and a transition from the control hold state to a suspended state in a mobile communication system according to an embodiment of the present invention.

FIG. 5 is a flowchart illustrating a procedure by which the base station can release the channels and then transition to the suspended state. In the active state, the dedicated traffic channel and the dedicated control channel are connected, and the base station performs the data communication function for the time $T_{\_Active}$ through the dedicated traffic channel and exchanges the control information through the dedicated control channel. If discontinuance of the data transmission exceeds the time $T_{\_Active}$ in the active state 117, the base station notifies the terminal of this condition through the dedicated control channel, releases the dedicated traffic channel and then transitions to the normal sub-state 151, in step 511. At this point, the time $T_{\_Active}$ is cleared. After the transition to the normal sub-state 151, the base station analyzes information on the dedicated control channel in step 513 to check whether the data to be transmitted is generated with the time $T_{\_Normal}$.

If there is no data to be transmitted for the time $T_{\_Normal}$ in the normal sub-state 151 of the control hold state 115, the base station senses this condition in step 513. Then, in step 515, the base station logically connects the forward and reverse dedicated control channels and the reverse pilot channel to control the output, notifies the terminal of the same, and then transitions to the resource save sub-state 153. Accordingly, since there is no signal transmitted from the terminal through the reverse link, it is possible to conserve power in the terminal. Further, since the dedicated control channel is logically connected, the base station can quickly send the data when needed. At this instant, the time $T_{\_Normal}$ is cleared.

After the transition to the resource save sub-state 153, the base station analyzes information on the dedicated control channel in step 517 to check whether the data is generated within the time $T_{\_Save}$. As indicated earlier, $T_{\_Save}$ is the reference time necessary for the transition from the resource save sub-state 153 to the suspended state 119. If the data to be sent is not generated for the time $T_{\_Save}$ in the resource save sub-state 153, the base station transitions to the normal sub-state 151 in step 519 to transmit the message necessary for the transition to the suspended state 119 to the terminal. Then, in the normal sub-state 151, the base station sends the suspended state transition message through the dedicated control channel and transitions to the suspended state 119 in step 529.

When the transition to the suspended state 119 takes place, the dedicated traffic channels and the reverse pilot channel assigned for the data transmission and the dedicated control channel are all released, and thereafter, if the data transmission is restarted, they are connected again. That is, if the data is generated in the suspended state 119, the base station transitions to the normal sub-state 151 to perform the above operation and then transitions to the active state 117.

In addition, if a high priority call occurs in the normal sub-state 151, the base station senses this condition in step 523 and directly transitions to the suspended state 119 in step 525. Further, if the high priority call occurs even in the resource save sub-state 153, the base station senses it in step 527, transitions to the normal sub-state 151 to exchange the suspended state transition message and then transitions to the suspended state 119.

When the transition from the active state 117 to the suspended state 119 takes place, the dedicated traffic channel and the pilot channel are released in sequence according to the data transmission discontinuance time. Further, when the high priority call occurs in the normal sub-state 151 and the resource save sub-state 153, the base station immediately transitions to the suspended state 119 to service the corresponding call.

In sum, when the transition from the active state 117 to the suspended state 119 takes place, the dedicated traffic channel and the pilot channel are released in sequence according to the data transmission discontinuance time. Further, when the high priority call occurs in the normal sub-state 151 and the resource save sub-state 153, the base station immediately transitions to the suspended state 119 to service the corresponding call.

As described above, in the mobile communication system according to the present invention, the control hold state 115 is divided into the normal sub-state 151 and the resource save sub-state 153 during the data communication service. In the resource save sub-state 153, the dedicated pilot channel and the dedicated control channel are logically connected to control the output so that the power consumption of the terminal may be reduced. Further, in regard to the intermittent closed loop power control between the terminal and the base station which is caused by interrupt and restart of the dedicated pilot channel, initial output values of the dedicated pilot channel and the dedicated control channel are determined in the event that the closed loop power control cannot be immediately performed. In addition, it is possible to detect the reverse pilot channel in view of the detected mobility of the terminal, so that the base station can detect the state in which the terminal controls the output of the pilot channel.

As described above, the mobile communication system according to the present invention can increase the overall data transmission efficiency by dividing the control hold state into the normal sub-state and the resource save sub-state, reducing the power consumption of the terminal to the level in the suspended state and reducing the time required in establishing the dedicated traffic channel necessary for data transmission.

While the invention has been shown and described with reference to a certain preferred embodiment thereof, it will be understood by those skilled in the art that various changes in form and details may be made therein by one skilled in the art. For instance, while the data communication method of the invention has particular utility when used in conjunction with a CDMA mobile communication system, it may also be practiced in other types of mobile communication systems such as those based on TDMA or AMPS. Accordingly, all such changes are intended to be included within the spirit and scope of the invention as defined by the appended claims.

What is claimed is:

1. A data communication method in a base station of a mobile communication system including an active state in which user data is transmitted through a dedicated traffic channel and a control message is transmitted through a dedicated control channel when there exists control information to transmit, said method comprising the steps of:

transitioning to a first control hold state for releasing the dedicated traffic channel and maintaining the dedicated control channel, when there is no data to transmit for a first set time in the active state; and transitioning to a second control hold state for logically connecting the dedicated control channel to control an output of a transmit signal, when there is no data to transmit for a second set time in the first control hold state.

2. The data communication method as claimed in claim 1, wherein said data to transmit is user data and control data.

3. The data communication method as claimed in claim 1, wherein said logical connection discontinues a transmission output of said dedicated control channel.

4. A data communication method in a terminal of a mobile communication system including an active state in which user data is transmitted through a dedicated traffic channel, a control message is transmitted through a dedicated control channel when there exists control information to transmit, and a pilot signal is transmitted through a reverse pilot channel, said method comprising the steps of:

transitioning to a first control hold state for releasing the dedicated traffic channel and maintaining the dedicated control channel and the reverse pilot channel; and transitioning to a second control hold state for controlling a transmission output of the dedicated control channel and the reverse pilot channel in order to conserve transmission power.

5. The data communication method as claimed in claim 4, wherein said transitioning to a first control hold state is performed when there is no control or user data to transmit for a first set time in the active state, and said transitioning to a second control hold state is performed when there is no control or user data to transmit for a second set time in the first control hold state.

6. The data communication method as claimed in claim 4, wherein said controlling the transmission output discontinues the transmission output of the dedicated control channel and the reverse pilot channel.

7. A data communication method in a mobile communication system including an active state, in which a base station transmits, to a terminal, traffic data through a forward dedicated traffic channel and control data through a forward dedicated control channel when there exists control information to transmit, in which the terminal transmits, to the base station, traffic data through a reverse dedicated traffic channel, control data through a reverse dedicated control channel when there exists control information to transmit, and power control information for a forward link through a reverse pilot channel, said method comprising the steps of:

if there is no data to transmit for a first set time in the active state, the base station notifies the terminal of this condition, and the base station and terminal release the reverse dedicated traffic channel simultaneously and then transition to a first control hold state; and if there is no data to transmit for a second set time in the first control hold state, transitioning to a second control hold state where the base station connects the forward dedicated control channel and notifies the terminal of this condition, and the terminal maintains the dedicated control channel and the reverse pilot channel to control a transmission output under the control of the base station.

8. The data communication method as claimed in claim 7, wherein said data to transmit is user data and control data.

9. The data communication method as claimed in claim 7, wherein the transmission output control step in the second hold state discontinues the transmission output of a corresponding channel.

10. A data communication method in a base station of a mobile communication system including an active state in which user data is transmitted through a dedicated traffic channel and a control message is transmitted through a dedicated control channel when there exists control information to transmit, the method comprising the steps of:

transitioning to a first control hold state for releasing the dedicated traffic channel and maintaining the dedicated control channel, when there is no data to transmit for a first set time in the active state;

establishing the dedicated traffic channel and transitioning to the active state, when data to transmit is generated within a second set time in the first control hold state;

transitioning to a second control hold state for logically connecting the dedicated control channel to control an output of a transmission signal, when there is no data to transmit for the second set time in the first control hold state;

restoring a transmission output, assigning the dedicated traffic channel and transitioning to the active state, when data to transmit is generated within a third set time in the second control hold state; and releasing the dedicated control channel and transitioning to a suspended state, when there is no data to transmit for the third set time in the second control hold state.

11. The data communication method as claimed in claim 10, wherein the data to transmit is user data and control data.

12. The data communication method as claimed in claim 10, wherein the transmission output control in the second hold state is to discontinue a transmission output of a corresponding channel.

13. A data communication method in a terminal of a mobile communication system including an active state in which user data is transmitted through a dedicated traffic channel, a control message is transmitted through a dedicated control channel when there exists control information to transmit, and a pilot signal is transmitted through a reverse pilot channel, the method comprising the steps of:

upon reception of control data for releasing the dedicated traffic channel in the active state, transitioning to a first control hold state for releasing the dedicated traffic channel and maintaining the dedicated control channel and the reverse pilot channel;

upon reception of a message for assigning the dedicated traffic channel in the first control hold state, establishing the dedicated traffic channel and transitioning to the active state;

upon reception of output control data in the first control hold state, transitioning to a second control hold state for maintaining the reverse dedicated control channel and the reverse pilot channel and controlling a transmission output, so as to conserve power;

upon reception of control data for restarting of data transmission in the second control hold state, discontinuing controlling the transmission output, establishing the dedicated traffic channel and transitioning to the active state; and upon reception of control data for channel release in the second control hold state, releasing the reverse dedicated control channel and the reverse pilot channel and transitioning to a suspended state.

14. The data communication method as claimed in claim 13, wherein the output control data, received in the first control hold state, is control data that a base station generates when there is no data to transmit within a preset time, and wherein the terminal discontinues a transmission output of the dedicated control channel and the reverse pilot channel upon reception of the output control data.

15. The data communication method as claimed in claim 13, wherein the control data for channel release, received in the second control hold state, is the control data that a base station generates when there is no data to transmit for a preset time.

16. A data communication method in a mobile communication system including an active state, in which a base station transmits, to a terminal, user data through a forward dedicated traffic channel and a control message through a forward dedicated control channel when there exists control information to transmit, in which the terminal transmits, to the base station, user data through a reverse dedicated traffic channel, a control message through a reverse dedicated control channel when there exists control information to transmit, and forward link power control information through a reverse pilot channel, said method comprising the steps of:

if there is no data to transmit for a first set time in the active state, the base station notifying the terminal of this situation, and the base station and the terminal release the dedicated traffic channel at the same time and transition to a first control hold state;

if data to be transmitted is generated within a second set time in the first control hold state, the base station notifying the terminal of this situation, establishes the dedicated traffic channel, and the base station and the terminal establish the dedicated traffic channel simultaneously and transition to the active state;

if there is no data to transmit for the second set time in the first control hold state, transitioning to a second control hold state where the base station notifies the terminal of this situation and the terminal maintains the reverse dedicated control channel and the pilot channel and controls a transmission output so as to conserve transmission power;

if data to be transmitted is generated within a third set time in the second control hold state, the base station restoring a transmission output and notifying the terminal of this condition, and thereafter, the base station and the terminal assign the dedicated traffic channel concurrently and transition to the active state; and if there is no data to transmit for the third set time in the second control hold state, the base station notifies the terminal of this condition, and then the base station and the terminal release the dedicated control channel concurrently and transition to a suspended state.

17. The data communication method as claimed in claim 16, wherein said data to transmit is user data and control data.

18. The data communication method as claimed in claim 16, wherein the output control step in the second control hold state discontinues a transmission output of a corresponding channel.

* * * * *